Figure 1:
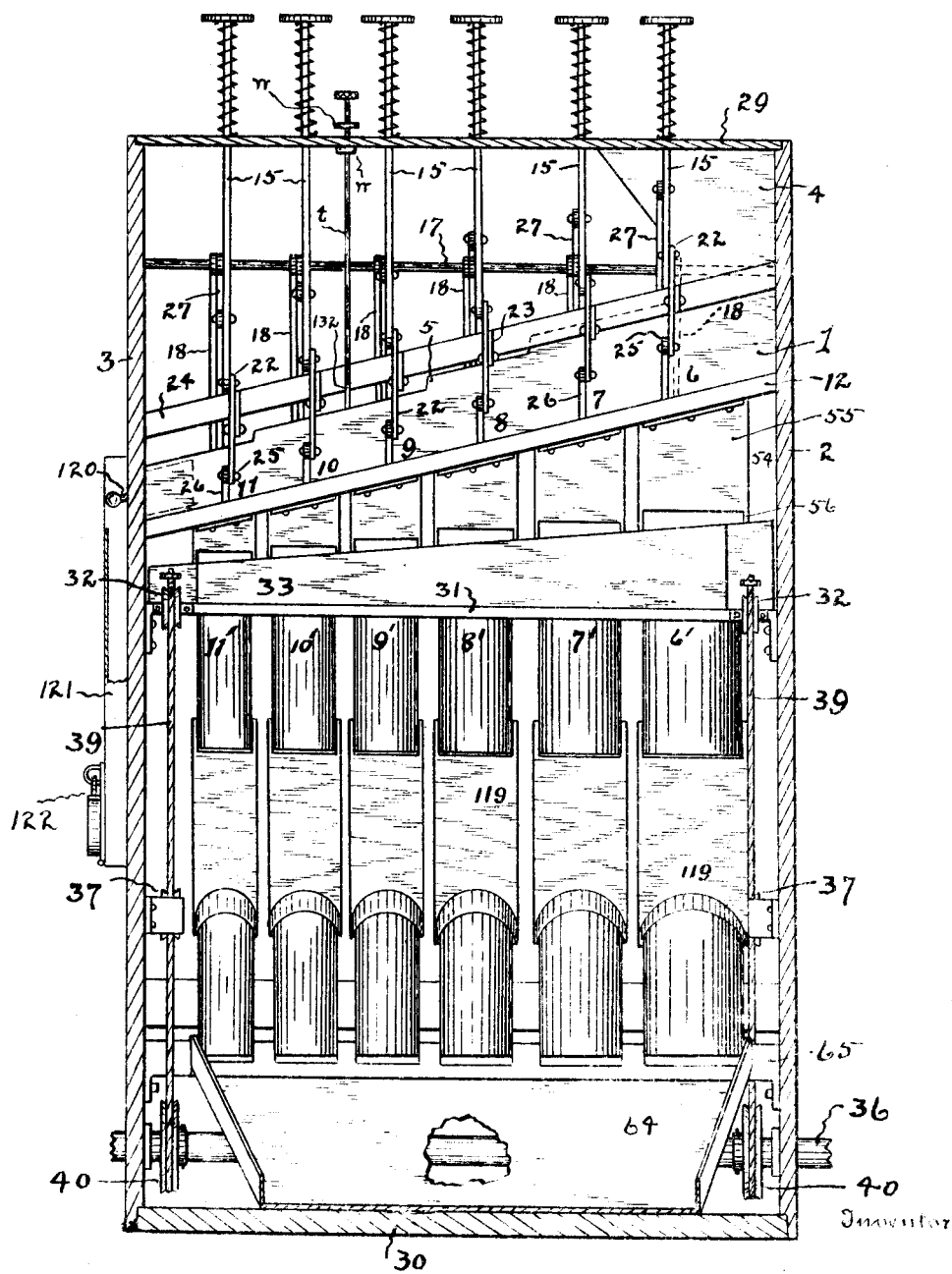

P. L. MONICAL.
COIN CHANGING AND REGISTERING APPARATUS.
APPLICATION FILED DEC. 20, 1915.

1,195,251. Patented Aug. 22, 1916.
8 SHEETS—SHEET 4.

Witnesses:
Arthur H. Sturges
Jane Losch

Inventor
Pearl L. Monical,
By Hiram A. Sturges,
Attorney

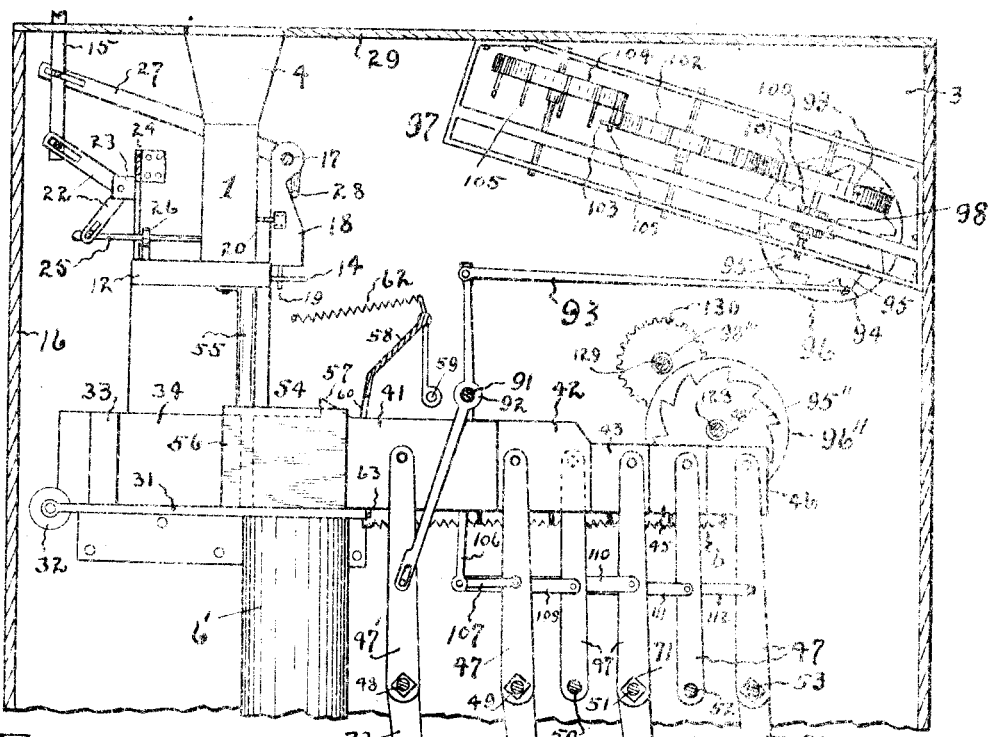
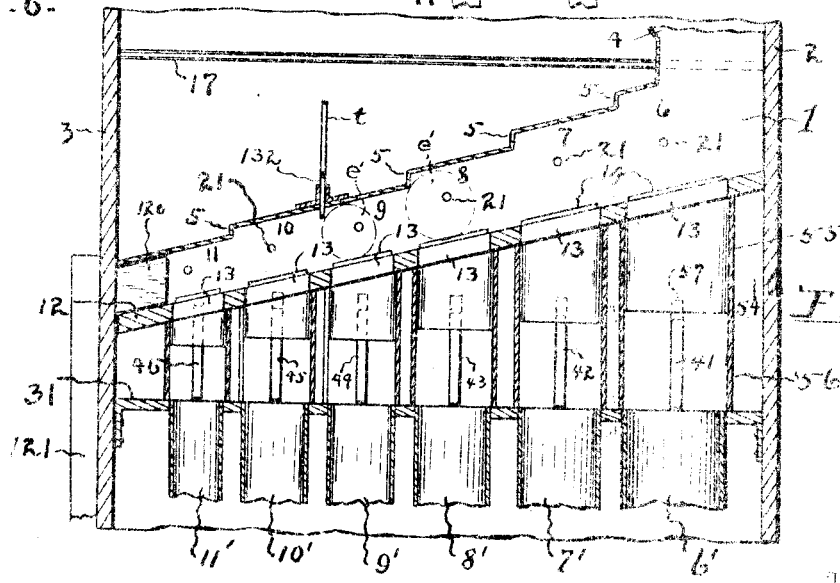

P. L. MONICAL.
COIN CHANGING AND REGISTERING APPARATUS.
APPLICATION FILED DEC. 20, 1915.
1,195,251.
Patented Aug. 22, 1916.
8 SHEETS—SHEET 6.
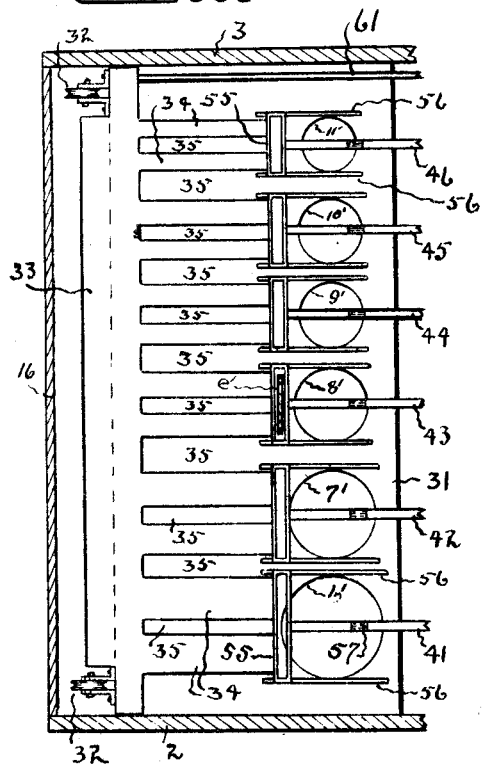
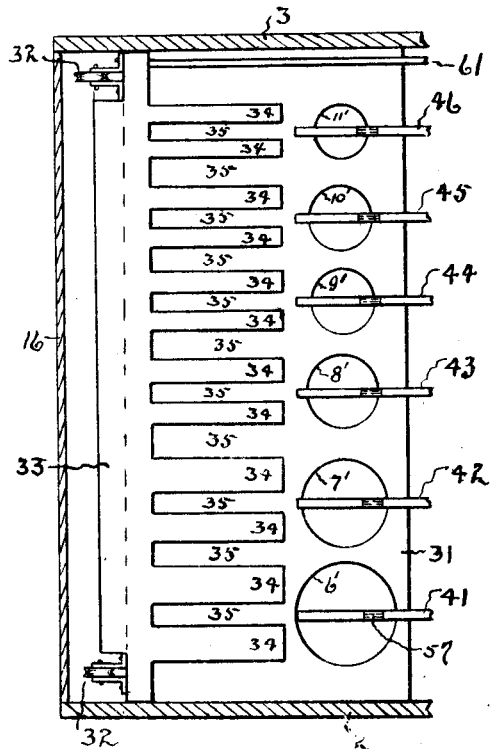
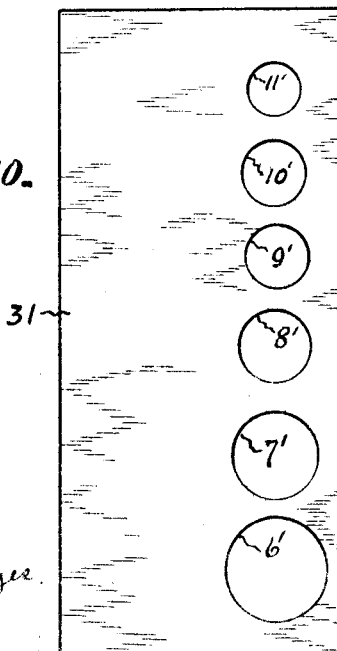
Witnesses
Arthur H. Sturges
Jane Losch
Inventor
Pearl L. Monical.
By
Hiram H. Sturges
Attorney

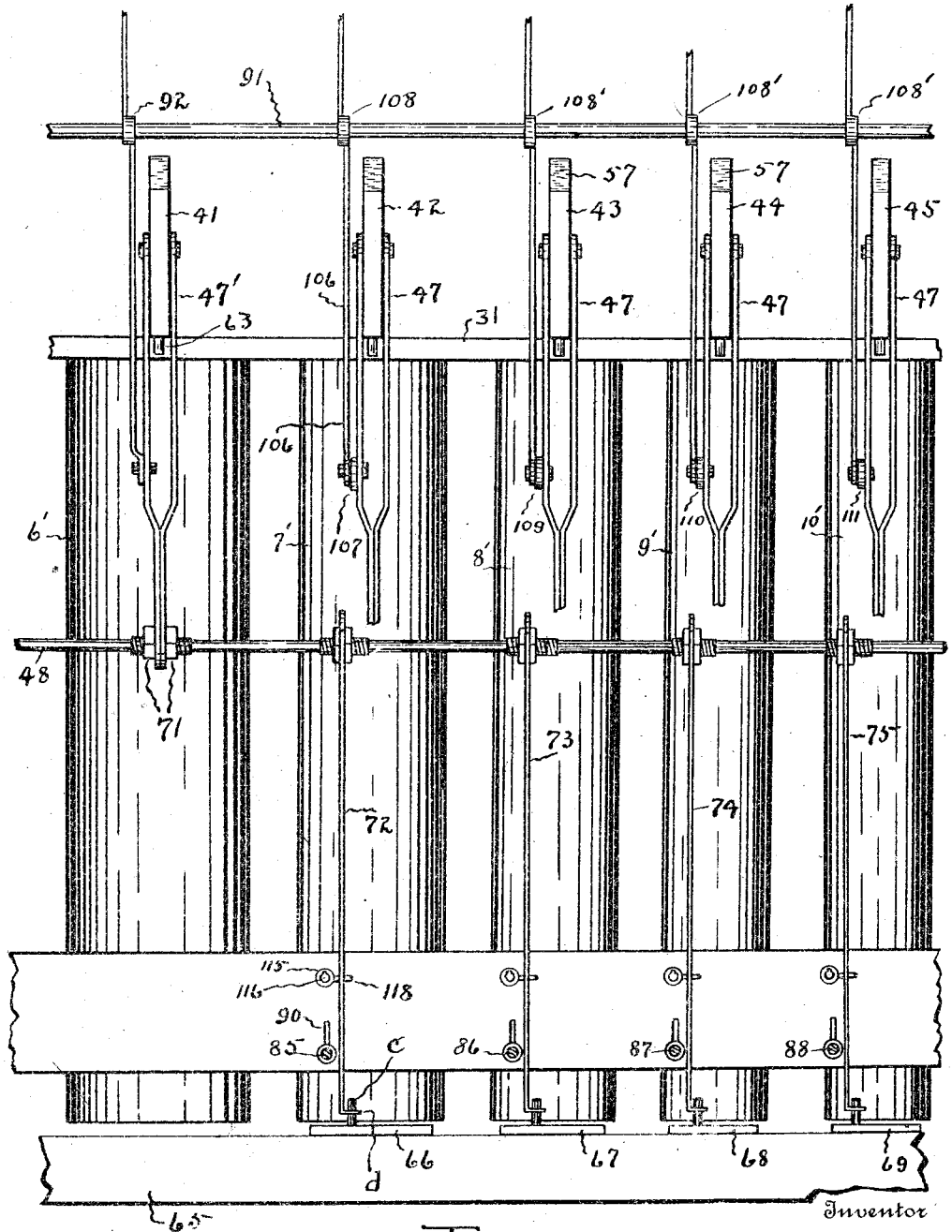

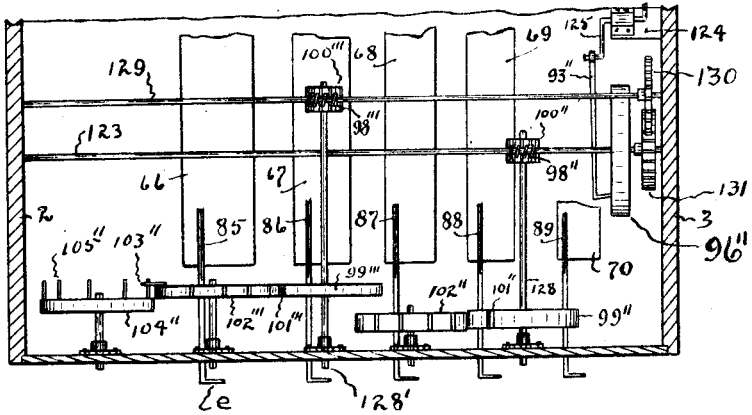
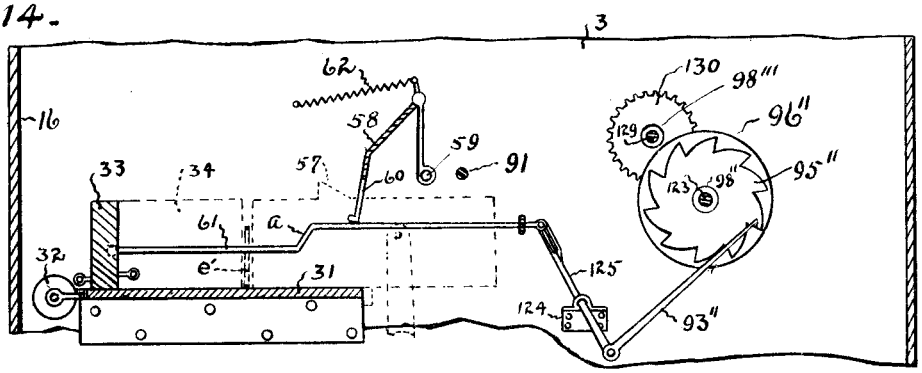
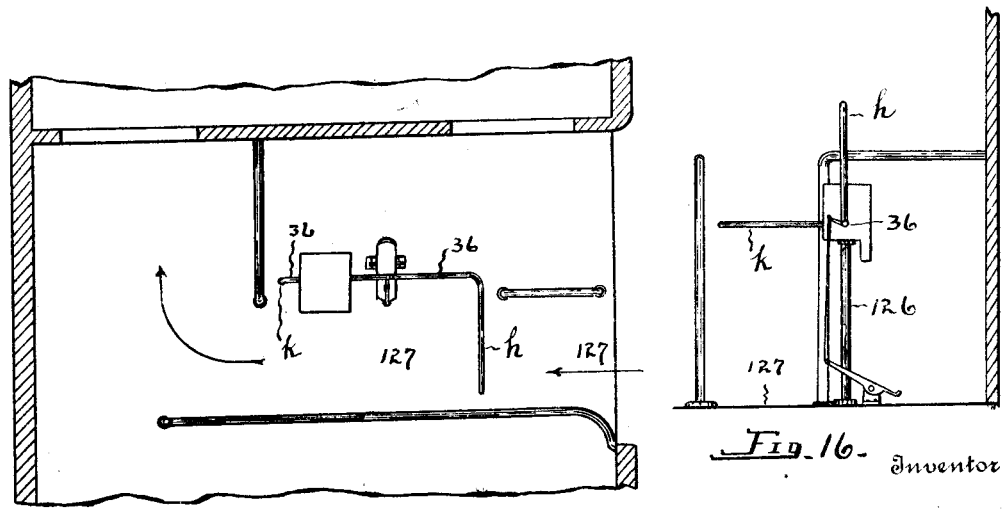

UNITED STATES PATENT OFFICE.

PEARL L. MONICAL, OF OMAHA, NEBRASKA.

COIN-CHANGING AND REGISTERING APPARATUS.

1,195,251.

Specification of Letters Patent. Patented Aug. 22, 1916.

Application filed December 20, 1915. Serial No. 67,722.

*To all whom it may concern:*

Be it known that I, PEARL L. MONICAL, a citizen of the United States, residing at Omaha, in the county of Douglas and State of Nebraska, have invented certain new and useful Improvements in Coin-Changing and Registering Apparatus, of which the following is a specification.

This invention relates to a coin changing and registering apparatus particularly useful upon street cars for the collection of fares from passengers or at gateways where fares are collected from persons passing therethrough, and has for its principal object to provide an apparatus which will occupy a limited space at a passageway, and so arranged that when a passenger deposits a coin within the apparatus in payment of a fare or a number of fares, a delivery of correct change will be made by means of the mechanism without the conductor or other person in charge of the passageway handling the coins.

One of the particular features of the invention is to provide such a construction that the person in charge will be unable to handle or have access to the coins received or to the coins delivered as change.

The invention also includes certain mechanism for registering the number of passengers who enter the car and for registering the amount of money received and the amount of change delivered.

With the foregoing objects in view and others to be mentioned, the invention presents a novel construction, combination and arrangement of parts as described herein and claimed, and as illustrated in the drawing wherein,—

Figure 2:
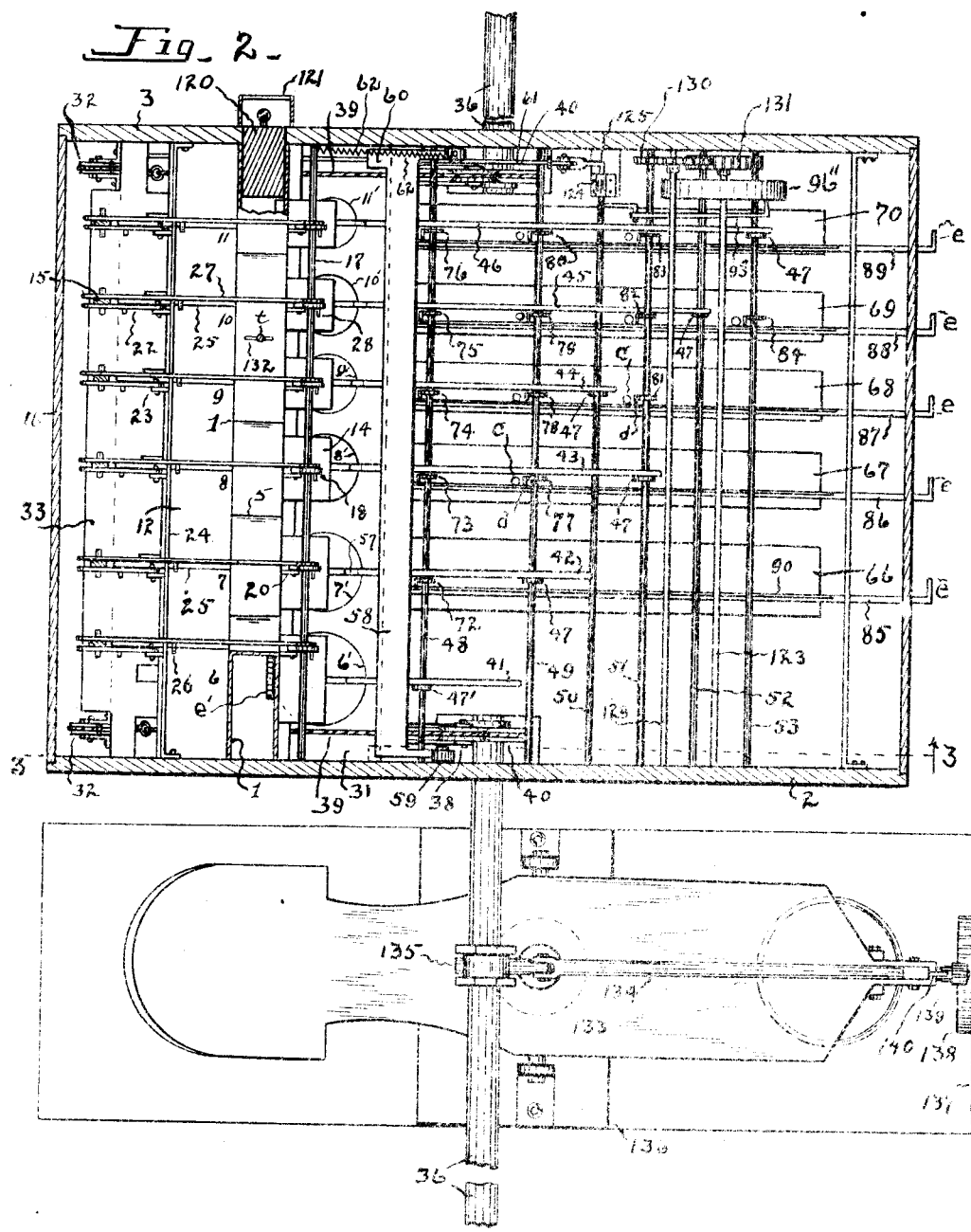
Figure 3:
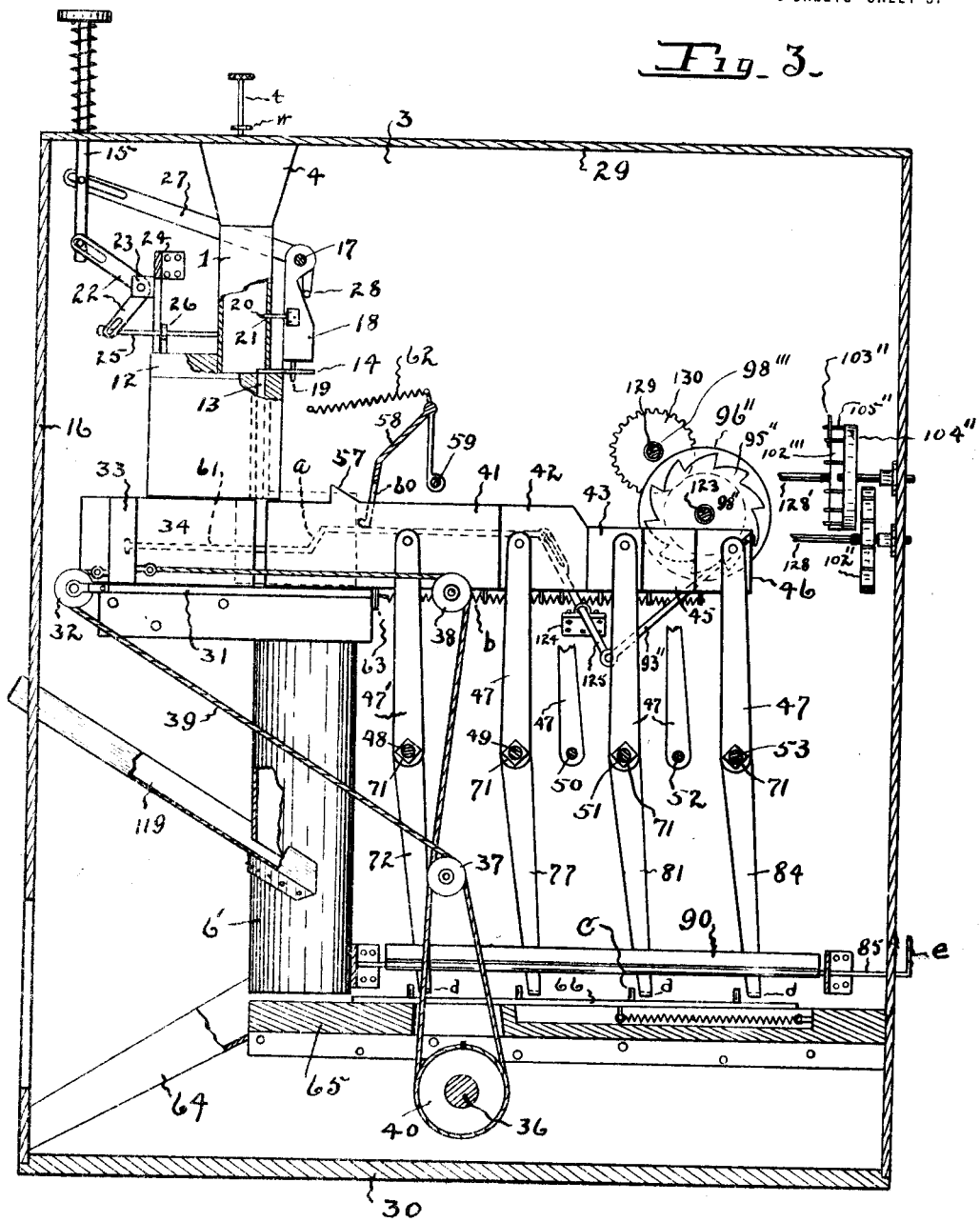
Figure 4:
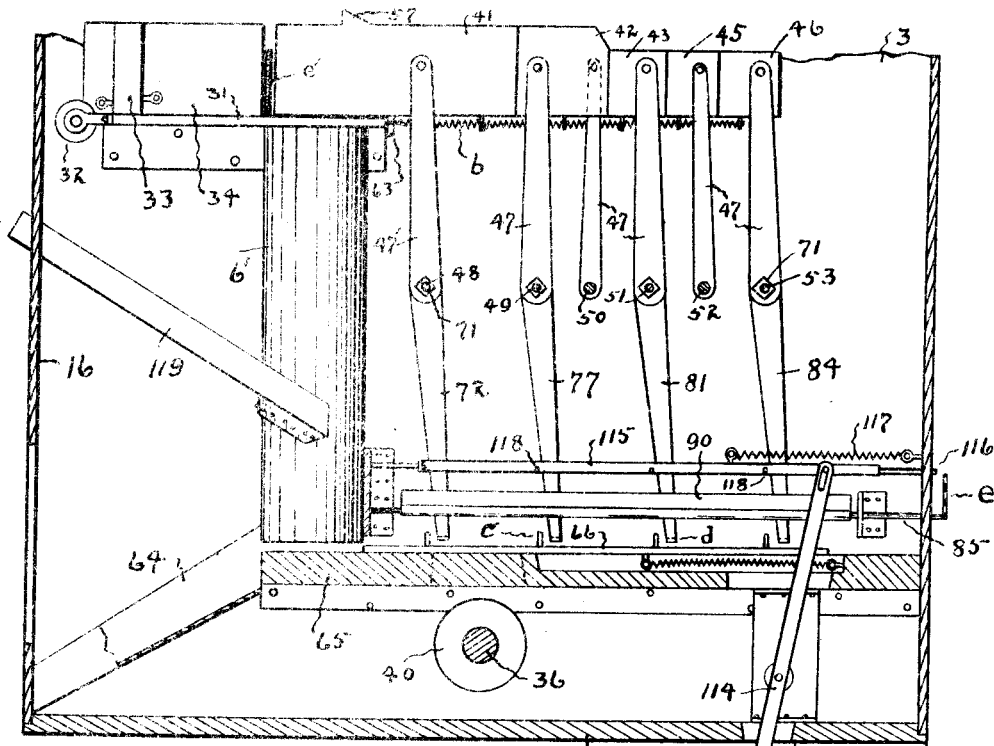
Figure 5:
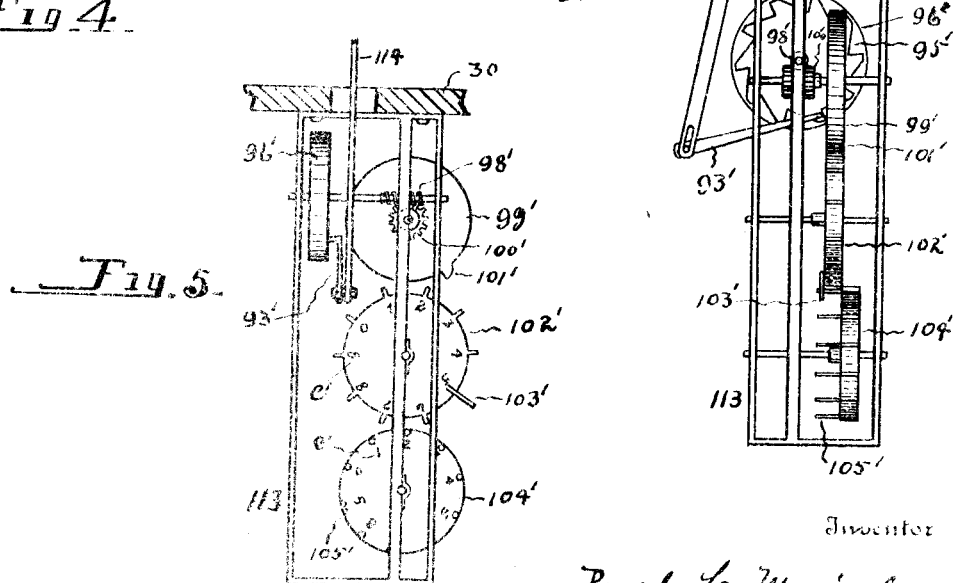

Figure 1 is a view of the apparatus in front elevation, the front side of the casing being removed. Fig. 2 is a plan view showing parts of the apparatus, the top of the casing being removed, and parts of the registering mechanism being omitted. Fig. 3 is a sectional view on line 3-3 of Fig. 2, the registering mechanism being omitted. Fig. 4 is a broken away view showing means for registering the amount of money delivered to passengers, by the apparatus, as change. Fig. 5 is a detail relating to Fig. 4, showing an end view of the registering disks. Fig. 6 is a broken away view showing means for registering the amount of money received by the apparatus from passengers. Fig. 7 is a detail showing a section through the coin chute and coin receptacles. Fig. 8 is a plan view of the conducting block and guides. Fig. 9 is a plan view of the conducting block. Fig. 10 is a plan view of a horizontal platform. Fig. 11 is a plan view of the bottom of the coin chute. Fig. 12 is a view on an enlarged scale, showing the rear ends of the plunger bars, and parts connected therewith. Fig. 13 is a plan view showing means for registering the number of passengers entering a car. Fig. 14 is a detail to clearly show the actuating-rod and parts connected therewith. Fig. 15 is a plan view showing the use of the device applied to a passageway. Fig. 16 is a view of the device in side elevation, applied to a passageway.

It may be stated that mechanism is shown and will be described for a control of the movements and the registering of coins in the usual denominations of the nickel, dime, quarter, half-dollar and dollar, and the delivery of similar coins, less than a dollar, in change.

The apparatus is particularly useful in connection with street car traffic, but while the operations are in many respects automatic, an attendant is required to be present, for taking up transfers and for adjusting certain parts where the fares of several passengers are paid by the deposit of a single coin.

It will be understood that while the apparatus is illustrated for use in connection with the particular coins mentioned, and specifically those of U. S. mintage, the parts could be changed in their proportions for use in connection with other coins, and operation would be substantially the same.

Referring now to the drawing for a more particular description, coin receiving mechanism is provided, consisting in part of a comparatively narrow, inclined, rectilinear chute 1 disposed between the side walls 2 and 3 of the casing and provided with a hopper 4 in which the coin may be deposited by a passenger in any of the denominations mentioned, the height of the chute not being uniform, but having ledges 5 formed in its upper wall and thereby providing the sections 6, 7, 8, 9, 10 and 11 corresponding substantially to the diameters of the respective coins as best shown in Figs. 1 and 7, so that when a coin $c'$ is deposited in the chute it will roll or move downwardly by gravity until it is engaged and detained by a ledge, and while detained will be maintained substantially in a vertical position.

At 12 is indicated an inclined plate which provides a bottom for the chute, and apertures 13 are formed therein through which the coins may pass when the detaining plates or gates 14, which normally cover said apertures, are withdrawn. To cause a sliding horizontal movement of the gates or any one of them, a plurality of vertical, resiliently mounted releasing-bars 15 are provided (Figs. 1. 3.) to be under control of the conductor. The chute and end 16 of the casing are preferably constructed of transparent material so that the coin in the chute may be seen, and the operator therefore, by visible inspection, may be able to depress the releasing-bar which corresponds to the section in which the coin is disposed.

Suitably supported by the sides of the casing and disposed adjacent to the chute, is a horizontal shaft 17 upon which are loosely mounted a plurality of levers 18, each being provided at its bottom with a projection 19 engaging in a plate or gate 14 and provided between its ends with a horizontal pin 20 which is disposed in a suitable aperture 21 formed in the inner wall of the chute, the numbers of said levers 18 corresponding to the number of sections of the chute.

Flexibly connected with the lower ends of the releasing bars 15 are bell-cranks 22 each of which has a mounting upon a flange 23 of the inclined angular plate 24, this plate extending between and being supported by the sides 2 and 3 of the casing, the lower end of each bell-crank being flexibly connected with the outer end of an alining rod 25.

The number of alining rods 25 correspond to the number of the sections of the chute. They are disposed horizontally, and the inner end of each of said rods engage in a suitable aperture (not shown) formed in the outer wall of a section of the chute while supported by a post or guide 26. At 27 are indicated rock-levers of angular form, each being loosely mounted between its ends on the shaft 17, its outer end being connected with a bar 15 and its inner end being provided with a transversely disposed pin 28 in engagement with a lever 18, between the ends thereof.

As thus described, a sliding movement of a releasing bar 15, inwardly of the casing, will cause coincident movements of the bell crank 22 and the rock lever 27 with which it is connected, the movement of the bell crank causing a sliding movement of the alining bar 25 for moving the coin, in one of the sections, into alinement with a slot 13, said coin being pressed by the bar 25 against the inner wall of the chute. This movement of the coin will cause a movement of the lever 18 to thereby move the slide or gate 14 outwardly or transversely of the chute. It will be noted that the movement mentioned for the rock lever 27 permits the swinging movement of the lever 18, and as soon as the coin reaches the slot 13 it will drop therein by action of gravity, the bar 15 being permitted to slide upwardly by the operator; and the upward movement of the bar 15, by operation of the rock lever 27, will cause the lever 18 to swing toward the chute; and the rod 25, by the upward movement of bar 15, will be drawn outwardly of the chute, since the bell crank 22 will be actuated.

Near the front part of the casing, midway between the top 29 and bottom 30 thereof, and suitably secured to the sides thereof is a horizontal partition or plate 31 provided near its ends, at its front edge with a pair of pulleys 32, and is formed near its rear edge with apertures for a mounting therein of a plurality of tubes or vertical coin receptacles which have diameters corresponding substantially to the diameters of the coins mentioned, and indicated at $6'$, $7'$, $8'$, $9'$, $10'$ and $11'$; and as best shown in Figs. 1 and 3, they are respectively disposed below and rearwardly of the sections 6, 7, 8, 9, 10 and 11 of the chute.

At 33 is indicated an elongated conducting-block, adapted to be disposed and to have slidable movements forwardly and rearwardly upon the stationary plate 31. It is provided with parallel prongs 34 which project inwardly of the casing, the recesses intermediate the prongs being indicated at 35. At 36, near the bottom and having bearings in the sides of the casing, is indicated a shaft adapted to have a reciprocative rotary movement. Any suitable means may be provided for moving the conducting-block by the movements of this shaft, the means herein shown being the use of the pairs of pulleys 37 and 38 mounted upon the sides of the casing, the pulleys 32 and the pair of cables 39, each cable having its ends secured to said block and engaging a pulley 32, 37 and 38 while mounted upon a pulley 40, said pulleys 40 being mounted upon the shaft 36, as best shown in Fig. 1.

Numerals 41, 42, 43, 44, 45 and 46 indicate resiliently mounted, horizontal plunger-bars, their front ends being normally disposed adjacent to the prongs 34 while supported upon the platform 31, and by means of suitable links $47'$ and 47 said plunger bars are also supported upon horizontal shafts, the shafts for the links of said plunger bars 41, 42, 43, 44, 45 and 46 being respectively indicated at 48, 49, 50, 51, 52 and 53, and having suitable bearings in the sides of the casing.

At 54 (Fig. 6) are indicated stationary guides interposed between the inclined plate 12 and the horizontal plate or platform 31, each guide consisting of a vertical, flat tube 55 and a pair of vertical side plates 56 which extend downwardly from the tube, one of said guides being provided for each slot 13. Each guide 54 is disposed with its flat tubular part projecting above a pair of prongs 34 in communication with a slot 13, each of the side plates 56 of a guide being disposed in a recess 35 of the conducting block.

It is not considered necessary to show or describe the means for moving each coin since the means employed for their movements are the same. After a coin passes through a slot 13 it will slide through the tubular part 55 of a guide and will be deposited between the adjacent ends of a pair of prongs 34 and the end of a plunger bar, the side-plates 56 of the guide preventing undue movements of the coin transversely of the prongs. One of the rotary movements of shaft 36 will cause a movement, inwardly of the casing, of the block 33, the coin being conducted to a position above one of the coin receptacles. It will be noted that the coin will be maintained in a vertical position during this movement, and while moving will be compressed between the ends of two prongs of block 33 and a resiliently mounted plunger bar. Each plunger bar is provided on its upper side or edge with a projection 57.

At 58 is indicated a detaining plate which is arranged to have a swinging movement since it is provided at each of its ends with a transversely disposed arm which is pivotally mounted at 59 to the casing, said detaining plate also being provided with a downwardly projecting finger 60.

Numeral 61 indicates an actuating-rod having its front end secured to the conducting-block and provided between its ends with an inclined part a. By means of the spring 62 the contact finger 60 is normally pressed downward upon and remains in engagement with rod 61.

It will be understood that the movement, inwardly of the casing, mentioned for the conducting-block will cause a corresponding movement of any one of the plunger-bars when a coin is compressed between the end of said bar and the ends of a pair of prongs of the conducting-block, as last described. This inward movement of the conducting-block will be continued until the coin is disposed above its coin receptacle, at which time, on account of the corresponding movement of the actuating-rod, the finger of the detaining plate will slide downwardly upon the inclined part a of said rod, to permit the detaining-plate to engage the projection 57 of the plunger bar. The drawing shows the projection 57 to consist of a vertical facet and an inclined facet, this being the preferred construction, the vertical facet being disposed substantially at right angles to the longitudinal axis of the plunger-bar. When the releasing-block moves inwardly of the casing, as described, the detaining plate will be permitted to move downward at the front of the vertical facet to detain the plunger bar and to prevent it, temporarily, from moving toward the prongs 34.

A part rotation of shaft 36 in a reverse direction to that last described will cause the block 33 to move toward its normal position near the wall 16 of the casing, which movement operates to release the coin so that it will drop into the coin receptacle, and the plunger bar, by action of its spring $b$, will move to its normal position with its outer end disposed adjacent to the tubular part 55 of a guide. The normal position, it will be understood, for the plunger bars, is that shown in Figs. 2, 3, and 6, said bars being pressed forwardly by springs $b$, each of said springs connecting a plunger bar with the stationary plate 31, the forward movement of each plunger bar being limited by its lug 63 when engaging the plate 31.

A passenger, for the purpose of paying a fare may deposit a coin of any of the denominations mentioned in the hopper 4 of the chute, and the proper change will be delivered to him upon the slide or tray 64 at the front part of the apparatus. Adjacent to the bottom of the casing is a horizontal platform 65 arranged in such a manner that the lower, open terminal of each coin receptacle will be disposed somewhat above the upper surface of said platform, so that, when delivering change, the coins, which are disposed horizontally in said receptacles, may be dislodged, as may be required. A plurality of resiliently mounted push plates are disposed upon the platform 65, each being provided with one or more lugs $c$, and adapted, when required, to be reciprocated longitudinally, parallel with the plunger-bars, one of their movements being to a point below the coin receptacles, the push plates for the coin receptacles 7', 8', 9', 10' and 11' being respectively indicated at 66, 67, 68, 69 and 70, the coin receptacle 6' requiring no push plate since the change to be delivered is less than a dollar.

In order that the push plates may be properly actuated, the lower end of link 47', of the plunger bar 41 and the lower ends of the links 47 of the plunger bars 42, 43 and 46 are rigidly connected with the respective shafts 48, 49, 51 and 53 by any suitable means, as by the nuts 71 threaded on the shafts mentioned, so that these shafts will have rotatable movements occasioned by the longitudinal movements of the plunger bars with which they are connected. Upon and extending below each of the shafts 48, 49, 51 and 53 are mounted rigidly certain contact-levers each being provided with a transverse projection at its lower end adapted to engage a projection $c$ of a push plate while said contact-lever is swinging in one direction. Since the contact-levers are rigidly mounted upon the shafts 48, 49, 51 and 53, they will have swinging movements when said shafts are partly rotated.

By referring to Fig. 2 it will be seen that shaft 48, which is actuated by link 47' whenever a coin of the denomination of a dollar is deposited in the coin receptacle 6', is provided with five of the contact-levers, these being respectively indicated at 72, 73, 74, 75 and 76, and these contact levers are disposed above and are adapted to cause sliding movements, respectively, of push plates 66, 67, 68, 69 and 70, and therefore it is obvious that whenever a coin of the denomination of a dollar is deposited in the coin receptacle 6', the movement of the plunger bar 41 will automatically cause a delivery to the cash tray 64 of five coins, these being a half-dollar, a quarter-dollar, two nickels and a dime, or a total of ninety five cents, as change.

If a half dollar is deposited in the hopper by a passenger, it will, by operation of the mechanism described, enter the coin receptacle 7', and the plunger bar 42 will be actuated, which will cause a rotatable movement of shaft 49, said shaft being provided with four of the contact-levers indicated at 77, 78, 79 and 80, and since these contact levers will engage the lugs $c$ of push plates 67, 68, 69 and 70, a quarter-dollar, two nickels and a dime will be delivered by the push plates to the tray 64, as required for forty-five cents in change.

If a quarter-dollar is deposited, it will cause actuation of the plunger-bar 43 to partly rotate the shaft 51, said shaft being provided with three contact-levers indicated at 81, 82 and 83, and since these last named levers will engage the lugs $c$ of push-plates 68, 69 and 70, two nickels and a dime, or a total of twenty cents will be delivered, as change.

If a nickel is deposited by a passenger, one of the plunger bars 44 or 45 will be actuated to cause a rotatable movement of the shaft 50 or 52, but since neither of these shafts have any connection with a push plate, nothing will be delivered, as change.

If a dime is delivered as payment of a single fare, the plunger bar 46 will be actuated to cause a part rotation of shaft 53, which is provided with the contact-lever 84. This last named lever will engage a lug $c$ of the push-plate 69 to cause a nickel to be delivered, as change.

As thus described, the apparatus is operative for delivering correct change where a single fare is paid. If it is desired to pay more than one fare with a single coin, certain parts are arranged so that correct change may be delivered, as the horizontal controlling-rods 85, 86, 87, 88 and 89, each preferably being provided with an angular terminal or crank $e$ and a leaf or longitudinal wing 90, said rods being mounted in suitable bearings and disposed parallel with and above the push-plates.

The contact-levers 72, 73, 74, 75, 76, 77, 78, 79, 80, 81, 82, 83 and 84, which project downwardly from the shafts 48, 49, 51 and 53 upon which they are rigidly mounted, are constructed, preferably, of attenuated, resilient material so that they will yield upon pressure. All of the projections $d$ of the contact-levers which are disposed above a push-plate are normally disposed in alinement with the projections $c$ of said push-plate, and it will be understood that any of the cranks $e$ may be manually swung substantially 90 degrees to cause the wing 90 of a controlling-rod to engage and to move the contact-levers laterally in such a manner that the projections $d$ will not engage the lugs of the push plate, while said contact-levers perform their swinging movements.

If a dime is deposited as a payment of two fares, the conductor, by causing a part rotation of the controlling-rod 88, will cause a swinging movement of the contact-levers 81, 82, 79 and 75, so that the push-plate 69 will not be moved, and therefore, no change will be delivered to the tray 64.

If a quarter of a dollar is deposited in the payment of two fares, in order that fifteen cents may be delivered as change, the conductor causes a part rotation of one of the controlling-rods 87 or 88.

From the description it will be understood that if a quarter of a dollar is deposited in payment of five fares, the conductor, in order that no change will be delivered, simply causes rods 87, 88 and 89 to be rotated substantially 90 degrees, so that the push-plates 68, 69 and 70 will not move at the time the plunger bar 43 performs its function.

It is considered that further explanation is not necessary except to state that by means of the construction as described, several fares may be paid by depositing a single coin, not exceeding a dollar, and the conductor, by use of the controlling-rods, may cause the correct change to be delivered.

Having described the operation of parts for delivering change, and the movements of the plunger bars and levers connected therewith, the registering mechanism and its operation will be readily understood.

For registering the money deposited in the coin receptacles, a shaft 91 is provided, said shaft being disposed horizontally and at right angles to the plunger-bars. At 92 is indicated a rock lever which is mounted on this shaft, its lower end being flexibly connected with link 47ª which is actuated by the plunger bar 41. Since a coin of the denomination of a dollar will be deposited in receptacle 6' whenever the plunger bar 41 is actuated, the resulting swinging movement of the rock lever 92 may be utilized for registering the dollars.

Upon the upper arm of the rock lever 92 is mounted a pull-rod 93 having a transverse finger 94 adapted to engage, in succession the ten pockets 95 formed in the end of the wheel 96 which is provided with a shaft journaled in a frame 97 attached to the walls of the casing. The shaft of the wheel 96 is provided with a worm 98. At 99 is a wheel having a shaft disposed at right angles to the shaft of wheel 96, said shaft also being journaled in the frame and being provided with a gear 100 in engagement with the worm 98 of wheel 96, said gear being of such proportion, compared to the worm 98, that the speed of the wheel 99 will be only one-tenth the speed of wheel 96, when the last named wheel is rotated.

The wheel 99 is provided with a peripheral tooth 101. At 102 is indicated a wheel having a shaft journaled in the frame, said wheel being provided with ten peripheral teeth, one of which is provided with a projection 103, and it will be understood that ten revolutions of wheel 99 will be required for causing one revolution of the wheel 102, since the tooth 101 will engage the teeth of the last named wheel in succession, the engagement of each tooth of wheel 102 being only when said wheel 99 completes a revolution.

Numeral 104 indicates a wheel having a shaft journaled in said frame, this wheel being disposed in non-alinement with wheels 96 and 102. It is provided at its periphery with ten uniformly-spaced, transverse projections 105 for engagement, in succession, with the projection 103 of the wheel 102, and therefore ten revolutions of the wheel 102 will be required for causing one revolution of the wheel 104. By use of the wheels or disks as described, a registration may be made showing a total of the coins of the denomination of a dollar, the usual characters being employed as shown in Fig. 5.

A second rock lever 108 is employed and mounted on the shaft 91, as best shown in Fig. 12, its lower arm 106 being provided (Fig. 6) with a connecting-bar 107 which is flexibly mounted on the link 47, said link being actuated by the plunger-bar 42. Since a coin of the denomination of a half-dollar will be deposited in the coin receptacle 7' whenever the plunger-bar 42 is actuated, the resulting swinging movement of the last mentioned rock lever may be depended upon for registering the half-dollars. The upper arm of rock lever 108 is provided with a pull-rod in all respects the same as the pull-rod 93, and the same registering device is provided for registering the half-dollars as already described.

Numerals 109, 110, 111 and 112 (Fig. 6) indicate connecting-bars which are flexibly mounted upon the links 47 of the respective plunger-bars 43, 44, 45 and 46; and rock-levers 108' which are identical in structure and operation with the rock lever 108, are provided and are mounted on the shaft 91, for actuating registering mechanisms similar in all respects to the parts mounted upon the frame 97.

Having shown and described the registering mechanism for one of the plunger-bars, it is not considered necessary to explain the registering mechanism for the remaining plunger bars, which, when actuated, cause a record to be made of all of the quarter-dollars, dimes and nickels which are deposited as fares.

Means for registering the amount of money delivered to passengers as change consist of mechanism now to be described. At 113 (Figs. 5, 6) is indicated a frame which, preferably, is mounted upon the bottom 30 of the casing. Upon this frame are mounted wheels 96', 99', 102' and 104', the wheel 96' being provided with ten pockets 95', and it is adapted to be rotated by a rock-lever 114. Wheel 96' is provided with a worm 98' adapted to engage a gear 100' upon the shaft of wheel 99', said last named wheel being provided with a single peripheral tooth 101' for engaging the teeth of wheel 102'. The wheel 104' is provided with ten transversely disposed projections 105' for engaging the single projection 103' of the wheel 102'. Since the structural parts and their operation are the same as already described for the plunger bars, a further explanation relative thereto is not necessary. The lower arm of the rock lever 114 projects below the casing and is flexibly connected with a pull-rod 93', its upper arm being connected with a sleeve 115 which is splined upon a horizontal supporting-rod 116, said sleeve being provided with a spring 117 and at longitudinal intervals with horizontally disposed projections 118. Since no change in the denomination of dollars is delivered, the link 47' is not provided with a contact-lever, but it will be understood that a registering means, in all respects the same as described, is provided for registering each half-dollar, quarter-dollar, dime and nickel delivered as change. Since the projections 118 upon the sleeves 115 are disposed in alinement, and, normally in alinement with the contact-levers of the series of projections 118, it will be understood that a movement of a contact-lever toward a coin receptacle, normally, will result in a corresponding sliding movement of a sleeve 115 and that, when the contact-levers are swung transversely by means of the rotatable movements of rods 85 as above explained, the sleeves 105, of course, will not be moved, and no coin or coins will be delivered.

It will be understood that, by subtracting the amount of money delivered as change from the amount of money received as fares, the difference should equal the amount of money remaining in the coin receptacles, when an accounting is made.

At 119 are indicated slides, with which the coin receptacles are provided, each slide being inclined downwardly from the front of the casing to communicate with a coin receptacle near the lower end thereof. In order that change may be delivered by the push-plates, at the commencement of a "run," the conductor or other person in charge may conveniently deposit coins in said receptacles, in specific amounts, which, when an accounting is made, is duly credited to him. If coins of the denomination of a penny are deposited as payment of a fare or fares, they will roll to the same section as the section provided for a dime, since the diameters of these coins are substantially the same, and they may be removed by withdrawal of the plug 120, best shown in Fig. 2. In operation, when the plug 120 is withdrawn, the pennies will drop into an elongated receptacle 121 which is disposed at the side of the casing, this receptacle being provided at its bottom with a suitable locking means 122. While this may cause a slight discrepancy in the accounting provided by the registering mechanism described, the fares which have thus been paid by use of pennies, may be duly credited to the conductor, when an accounting is made.

In order that the number of passengers entering the car may be registered, a wheel 96'' is employed, and is provided with ten pockets 95''. this wheel being mounted on a shaft 123 (Fig. 13.) having bearings in the sides of the casing. Upon the inner side 3 of the casing is mounted a bracket 124 which provides bearings for an angular rock lever 125, one arm of which is connected loosely with the inner end of the actuating rod 61, its opposite arm being connected with a pull-rod 93'' which is adapted to engage in the pockets 95'' of the wheel 96'', and it will be understood by an inspection of Fig. 14 that an inward movement of the block 33, regardless of the interposition of a coin between the ends of the prongs 34 and a plunger bar, will cause a corresponding movement of the actuating-rod 61 so that the rock lever 125 will be actuated to cause a rotatable movement of said wheel 96'', the parts being so proportioned that this wheel will perform one-tenth of a rotation at each inward movement of the block 33.

The reciprocative rotary movement of shaft 36 is in an arc of substantially 90 degrees, and as shown in Figs. 15 and 16, the ends of this shaft are provided with arms $h$ and $k$ which are disposed substantially at right angles to each other. The device may be mounted upon a standard 126 adjacent to a passageway 127 of a car, and during the movements of the shaft 36 the arms $h$ and $k$ may control the passageway in such a manner that the entrance of each passenger to the car may be registered.

From the description it will be understood that a reciprocative rotary movement of the shaft 36 will cause longitudinal reciprocation of the actuating-rod 61, and since this movement of the rod 61 will occur whenever a passenger passes the device or the angularly disposed arms of its shaft at the passageway 127 to enter the car, registration of the total number of passengers thus entering, may be made.

For registering the number of passengers entering the car, mechanism is provided similar to that already described, the shaft 123 being provided with a worm 98'' adapted to engage the gear 100'' upon the shaft 128 which is disposed at right angles to said shaft 123 and having bearings in the rear wall of the casing, the relative proportions of said worm and gear being such that ten revolutions of the wheel 96'' will be required to cause a single revolution of shaft 128. Upon the last named shaft is mounted a wheel 99'' having a peripheral tooth 101''.

Numeral 102'' indicates a wheel having a shaft in suitable bearings, and provided with ten teeth, and which, for a single revolution will require ten rotations of the wheel 99''. The wheels or disks 99'' and 102'' thus described are very useful in instances where a limited amount of registering is desired.

For the purpose of registering a large number of passengers who enter a car, and for use during a more extended period of time, mechanism is provided therefor by use of a shaft 129 disposed parallel with the shaft 123, and upon which is mounted a gear wheel 130, said shaft 129 being adapted to rotate at a speed corresponding to the revoluble speed of shaft 123 since the shaft 123 is provided with a gear wheel 131 engaging and having a diameter corresponding to the diameter of said gear wheel 130.

A plurality of registering disks similar to those described are arranged to be actuated by the revoluble movement of shaft 129, said shaft being provided with a worm 98''', and there being provided a wheel 99''' having a single tooth 101''', said last named wheel being mounted upon a shaft 128' having suitable bearings and provided with a gear 100''' in engagement with the worm 98''' of said shaft 129. On account of the proportion provided for the worm 98''' and gear 100''', ten rotations of the gear wheel 130 will be required to cause a rotation of wheel 99'''.

Numeral 102''' indicates a disk having a shaft in suitable bearings and provided with ten peripheral teeth adapted to successively engage the single tooth 101''' of wheel 99''', and therefore it will have one-tenth the revoluble speed of said wheel 99''', and ten rotations of the wheel 102''', which is provided with a projection 103'', will be required to cause one rotation of the wheel 104'', said projection 103'' engaging the transverse projections 105'' of the wheel 104'' in succession.

Numeral 132 indicates a spacing-plate provided with a rod $t$, as best shown in Figs. 1 and 7. It is disposed vertically in a plane midway between sections 8 and 11 of the inclined coin-chute 1, and is adapted to be moved into the chute a limited distance whenever desired. Since a large proportion of the fares may be of the denomination of a nickel and which, normally, would roll to section 10, a conductor, by moving the rod $t$ downwardly, may cause the nickels thus deposited as fares to be detained in section 9 for entering the receptacle 9', and by the means described a control is provided for causing a suitable distribution of the nickels in the coin receptacles 9' and 10'. The vertical movements of the spacing-plate will be limited by means of the lugs $w$ so that it will not obstruct a movement of the dimes which roll to section 11.

To provide means for conveniently operating the shaft 36 so that it may be rotated first in one direction and then in an opposed direction for causing longitudinal reciprocation of the block 33, a treadle 133 is provided, its pull-bar 134 being connected with the crank 135 (Fig. 2.) of said shaft. The treadle is preferably mounted upon a horizontal support 136 which is provided with an upright plate 137 upon which is secured a ratchet wheel 138, preferably of elliptical form. The toe-portion of the treadle is provided with a toothed spindle 139 arranged for rotation while engaging the ratchet 138, and in operation, the spindle, during a downward and an upward movement of the treadle will engage all of the peripheral teeth of said wheel 138, a pawl 140 being provided so that the toothed spindle will rotate only in one direction. This particular construction is for the purpose of preventing a rotation of less than 90 degrees for the shaft 36, and to provide uniformity in the movements of said shaft and block 33.

Having described the several parts and their functions, a further explanation relating to operation is not necessary. While I have shown and described these parts in detail I do not wish to be understood as limiting myself in this respect, nor to the form, size, proportion or material to be used, further than expressed in the appended claims.

What I claim as my invention and desire to secure by Letters Patent is,—

1. In mechanism for the purpose described, an inclined coin chute arranged longitudinally as sections having heights corresponding substantially to coins of different diameters and having a width less than the diameters of the coins, each being provided with an aperture in its bottom, a plurality of upright tubular receptacles for containing coins disposed below and in a plane adjacent to the plane of the coin chute, a conducting block, resiliently mounted plunger bars disposed substantially parallel with the conducting block, a plurality of gates adapted to normally cover the apertures of the coin chute, means for coincidently removing a gate from the aperture of a coin chute and moving a coin to permit it to be interposed between a plunger bar and conducting block by passing through the aperture of the coin chute, means for controlling the movements of the conducting block and plunger bar for moving the interposed coin for the deposit thereof in a tubular receptacle, and means connected with the plunger bar for moving the coins from the tubular receptacles.

2. In mechanism for the purpose described, an inclined coin chute arranged in sections for containing coins of different diameters, each section being provided with an aperture in its bottom, upright tubular receptacles for containing coins each being disposed below and adjacent to a section of the coin chute, a conducting block provided on one of its sides with a plurality of prongs and disposed in a horizontal plane intermediate the coin chute and said receptacles, resiliently mounted plunger bars each being disposed substantially parallel with and in a plane intermediate two of the prongs of the conducting block, a plurality of gates adapted to normally cover the apertures of the bottoms of said sections, a horizontal shaft, a plurality of levers mounted on said shaft and disposed adjacent to said chute each being connected with a gate and provided with a projection having a part normally disposed in a section of the chute, means for coincidently moving a lever for removing a gate from the aperture of a section and for moving a coin to permit it to be interposed between the end of a plunger and the ends of two adjacent prongs of the conducting block by passing through the aperture of said section, and means for moving the interposed coin for the deposit thereof in a tubular receptacle.

3. In mechanism for the purpose described, a coin chute for a deposit therein of coins of different diameters and having a width less than the diameters of the coins and provided with apertures in its bottom, a plurality of upright, tubular receptacles for containing coins of greater and lesser diameters disposed below and in a plane adjacent to the plane of the coin chute, a conducting block, plunger bars disposed substantially parallel with the conducting block, a plurality of gates adapted to normally cover the apertures of the coin chute, means for coincidently removing a gate from the aperture of a coin chute and moving a coin to permit it to be interposed between a plunger bar and conducting block by passing through the aperture of the coin chute, means for controlling the movements of the conducting block and plunger bar for moving the interposed coin for the deposit thereof in a tubular receptacle, push plates disposed adjacent to the bottoms of the tubular receptacles, and a plurality of levers movable by the plunger bar for actuating the push plates to move the coins from the tubular receptacles.

4. In mechanism for the purpose described, a coin chute for a deposit therein of coins of greater and lesser diameters, a plurality of upright tubular receptacles for containing coins of greater and lesser diameters disposed below and in a plane adjacent to the plane of the coin chute, a conducting block, plunger bars disposed substantially parallel with the conducting block, means for moving a coin from the coin chute to permit it to be interposed between a plunger bar and conducting block, means for controlling the movements of the conducting block and plunger bar for moving the interposed coin for the deposit thereof in a tubular receptacle, push plates disposed adjacent to the lower ends of the tubular receptacles, a plurality of levers movable by the plunger bar for actuating the push plates to move the coins from the tubular receptacles, rock levers arranged to be actuated by the movement of the levers, and a plurality of disks movable by the rock levers for numerically indicating the coins which are moved from said tubular receptacles.

5. In mechanism for the purpose described, an inclined chute arranged longitudinally as sections having heights corresponding substantially to coins of different diameters and having a width less than the diameters of the coins, each being provided with an aperture in its bottom, a plurality of upright tubular receptacles for containing coins disposed below the coin chute, a conducting block, a plurality of plunger bars, means for moving a coin through the aperture of the coin chute to permit it to be interposed between a plunger bar and conducting block, said conducting block being movable for moving the plunger bar and the interposed coin to permit a deposit of said coin in a tubular receptacle, means connected with the plunger bar for moving the coins from the tubular receptacles, an actuating rod movable with the conducting block, a pull-rod movable by the actuating rod, and a plurality of indicating-disks arranged for rotation by the movements of the pull-rod.

6. In mechanism for the purpose described, a coin chute for a deposit therein of coins of different diameters and having a width less than the diameters of the coins and provided with apertures, a plurality of upright tubular receptacles for containing coins of greater or lesser diameters disposed below and in a plane adjacent to the plane of the coin chute, a conducting block, plunger bars disposed substantially parallel with the conducting block, a plurality of gates adapted to normally cover the apertures of the coin chute, means for coincidently moving a gate from the aperture of a coin chute and moving a coin to permit said coin to be disposed between a plunger bar and conducting block by passing through the aperture of the coin chute, said conducting block being movable for moving the plunger bar and interposed coin for the deposit of said coin in a tubular receptacle, push plates disposed adjacent to the lower ends of the tubular receptacles, a plurality of levers movable by the plunger bar for actuating the push plates to move the coins from the tubular receptacles, an actuating rod movable by the conducting block, and a plurality of indicating disks arranged for rotation by the actuating rod.

7. In mechanism for the purpose described, a coin chute for a deposit therein of coins of greater and lesser diameters, a plurality of tubular receptacles for containing coins of greater and lesser diameters, a conducting block, a plurality of plunger bars, means for moving a coin from the coin chute to permit it to be interposed between a plunger bar and conducting block, said conducting block being movable for moving the plunger bar and interposed coin for the deposit of said coin in a tubular receptacle, push plates disposed adjacent to the lower ends of the tubular receptacles, a shaft provided with bearings and adapted to have revoluble movements by a movement of the plunger bar, a plurality of levers movable by the shaft for actuating the push plates to move the coins from the tubular receptacles, rock levers arranged to be actuated by the movement of the levers, and a plurality of disks movable by the rock levers for numerically indicating the coins which are moved from said tubular receptacles.

8. In mechanism for the purpose described, a coin chute for a deposit therein of coins of different diameters and having a width less than the diameters of the coins and provided with apertures, a plurality of tubular receptacles for containing coins of greater or lesser diameters disposed below the coin chute, a conducting block, a plurality of plunger bars, a plurality of gates adapted to normally cover the apertures of the coin chute, means for coincidently moving a gate from the aperture of a coin chute and moving a coin in a manner to permit said coin to be interposed between a plunger bar and the conducting block by passing through an aperture of the coin chute, said conducting block being movable for moving the plunger bar and interposed coin for the deposit thereof in a tubular re-receptacle, push plates provided with lugs and disposed adjacent to the tubular receptacles, a plurality of levers each provided with a lug and disposed with their lugs normally in alinement with the lugs of the push plates, said levers being movable by the plunger bar for actuating the push plates to move the coins from the tubular receptacles, an actuating rod movable by the conducting block, a plurality of indicating disks arranged for rotation by the actuating rod, and means to shift the levers to dispose their lugs in non-alinement with the lugs of the push plates.

In testimony whereof, I have affixed my signature in presence of two witnesses.

PEARL L. MONICAL.

Witnesses:
HIRAM A. STURGES,
ARTHUR H. STURGES.